3,471,415
MAGNETIC INKS CONTAINING LECITHIN AS A SURFACTANT
Harry Friedman, deceased, late of East Orange, N.J., by Honora Friedman, executrix, East Orange, N.J., and Roger N. Langmaid, Cranbury, N.J., and Don E. Pickart, Boulder, Colo., assignors to International Business Machines Corporation, Armonk, N.Y., a corporation of New York
No Drawing. Filed Dec. 20, 1966, Ser. No. 603,712
Int. Cl. C09d *11/00, 3/34;* H01f *10/02*
U.S. Cl. 260—23.7                                    9 Claims

ABSTRACT OF THE DISCLOSURE

Lecithin used to disperse magnetic materials in binders therefor used in recording devices is immobilized by the presence of a drying oil more reactive than linseed oil.

---

This invention relates to coating systems in which a lecithin is a surfactant. More particularly, the invention concerns a novel method for inhibiting the migration of the lecithin in such systems which may occur following application of the coating. More specifically, the invention concerns the preparation of a magnetic ink of improved properties adapted to form magnetic recording media.

It is known to utilize lecithin as a surface active agent in the preparation of coating systems employing difficultly dispersible pigments, such as, for example, magnetic iron oxide. One of the problems which occurs in the production and use of pigment dispersions, or dispersion of like finely divided solids, for coatings is the migration of the dispersing agent or surfactant after the coating has been applied to a surface. Thus, for example, in the manufacture of magnetic tape of the type employed in conjunction with magnetic read-out devices, or with dictating machines, the migration of the dispersing agent, such as, for example, lecithin, to the surface of the coating, produces stickiness and tackiness, increases in starting time, and undue wear when the tape is used.

In accordance with the present invention, it has been found that the tendency of the dispersing agent, such as lecithin, to migrate can be overcome by incorporating in the coating formulation a substance containing two or more conjugated double bonds and which is capable of reacting with the lecithin to immobilize it after the coating has been applied. The reaction product is higher in molecular weight than the reactants, and is believed to be polymeric in character. It remains in the coating composition and becomes an integral part of the binder.

Lecithin surfactants within contemplation of the invention include lecithins derived from soybean oil or corn oil manufacture. The lecithins are themselves unsaturated in character, being mixtures of the diglycerides of stearic, palmitic, and oleic acids, together with glycerides of linoleic or linolenic acids.

The substance containing two or more conjugated double bonds which is employed to react with the lecithin, in accordance with the invention, is advantageously a drying oil which is capable of reacting with the lecithin to immobilize it. Examples of suitable drying oils having this property include tung oil, oiticica oil, and dehydrated castor oil.

The reaction between the drying oil and the lecithin does not require the presence of a catalyst, but the rate of reaction can be accelerated by the use of a suitable catalyst, such as, for example, sulfur or a bivalent metal. For instance, the drying oils set out above and not requiring the presence of a catalyst may be characterized as being more reactive than linseed oil.

The proportion of the lecithin to the drying oil is not critical, except that a sufficient amount of drying oil should be employed to react with all the lecithin present. The proportion of drying oil to lecithin may range from about 2:1 to about 1:2 parts by weight, preferably about 1:1, but a larger excess of drying oil may be employed if desired.

The practice of the invention will be illustrated with regard to a magnetic ink composition suitable for application to a tape, but it will be understood that this is for purposes of illustration only, and is not to be regarded as limiting.

The ink comprises a magnetic iron oxide ingredient in admixture with a small amount of carbon. The iron oxide is of the gamma or acicular variety, readily available commercially.

In order to promote adhesion of the iron oxide to the tape, the coating composition includes a binder comprising one or more synthetic polymers having requisite properties of flexibility and elasticity.

The binder composition includes not only the polymers, but also a sufficient amount of a lecithin to function as a surfactant for the iron oxide pigment to wet the iron oxide and facilitate the dispersion thereof. There is also incorporated in the binder mixture a suitable proportion of a drying oil capable of reacting with the lecithin present to prevent migration of the lecithin when the coating is applied to the tape.

The polymeric component of the binder composition may include, for example, copolymers of butadiene and acrylonitrile, copolymers of vinyl chloride and vinyl acetate, and copolymers of acrylonitrile and styrene, or mixtures of these copolymers. Thus, a binder which is suitable is one comprising 40% by volume of a mixture of a polymer of about 67% butadiene and 33% acrylonitrile, which 40% may also include as much as 10% by weight of an 87% vinyl chloride-13% vinyl acetate copolymer. The 40% of butadiene-acrylonitrile-polyvinyl chloride-polyvinyl acetate is admixed with 60% by volume of a copolymer of 24% acrylonitrile and 76% styrene. The 67/33 butadiene-acrylonitrile copolymer is sold commercially under the designation Hycar 1432, a medium high nitrile rubber, by Goodrich Chemical Co., while the acrylonitrile-styrene 24/76 copolymer is sold commercially under the designation Tyril 760 by Dow Chemical Co. The proportion of the butadiene-acrylonitrile copolymer to the acrylonitrile-styrene copolymer may be varied considerably, ranging from about 40:60 to about 60:40 parts by weight. Other ingredients may be added or other binder systems used.

The proportion of iron oxide to binder may be varied over a wide range, but in view of the nature of the magnetic ink composition, the loading with pigment will be high, ranging from about 40% upward, by volume. Advantageously, the proportion of iron oxide to binder is about 40:50 parts by volume, with additional ingredients going to make up the remaining 10%.

In accordance with the invention, there is incorporated in the coating composition as a surfactant, an amount of a lecithin ranging from about 2% to about 10% by volume of the total solids content of the composition.

If desired, there may be admixed with the iron oxide, or other ferromagnetic material, a small proportion of carbon, ranging from about 5% to about 10% by volume of the total solids content, preferably about 6%. The carbon may be in form of carbon, graphite, or other pigment types of carbon.

There is included in the coating inks an amount of a conventional solvent or diluent to adjust to any desired consistency or viscosity.

The coating composition may be applied to any solvent compatible conventional plastic tape material, such as, for example, Mylar (polyethylene terephthalate), cellulose acetate, and the like.

The practice of the invention is illustrated by the following example, which is not, however, to be considered as limiting:

Example

A magnetic ink was prepared by admixing 40 parts by volume of Hycar 1432 (a 67/33 butadiene-acrylonitrile copolymer containing about 10% by volume of 87/13 vinyl chloride-vinyl acetate copolymer) with 50 parts by volume of Tyril 760, a 24/76 acrylonitrile styrene copolymer and about 7% polyvinyl chloride-polyvinyl acetate (Geon 427, B. F. Goodrich) and about 3% antioxidant to form a binder. 48 parts by volume of this binder were then admixed with 39 parts by volume of magnetic iron oxide of conventional particle size, 4 parts by volume of soya lecithin, and 5 parts by volume of carbon and a small amount of a suitable lubricant. To the foregoing mixture there was added 4% by volume of tung oil, and mixing was continued until a homogeneous product was obtained.

The resulting tape had high signal output, which is characteristic of a well dispersed magnetic system, and exhibited no tackiness or stickiness. Tape made from the same formulation, with the exception that no tung oil was incorporated, had a pronounced tackiness at its surface, tended to lag in start time when being reeled and unreeled, and exhibited a greater tendency to wear than tape made with the formulation including tung oil.

While the foregoing example discloses an important and preferred exemplary embodiment of the invention, wherein a ferromagnetic material is being dispersed in a binder medium, those skilled in the art will recognize the principles of the invention can be applied wherever finely divided solid particles are to be dispersed in a coating system with the assistance of lecithin. For instance, the principles of the invention are applicable when other types of finely divided magnetizable solid particles are being dispersed in coating compositions to be used for the purposes indicated above, or when pigments are being dispersed in protective or decorative coatings.

What is claimed is:

1. In a coating system, in which a lecithin is employed as a surfactant, the improvement which comprises incorporating in the coating an amount of a drying oil containing two or more conjugated double bonds which is capable of reacting with the lecithin present to immobilize and prevent migration of the lecithin after the coating has been applied to a substrate.

2. The coating system of claim 1 wherein the drying oil is selected from the group consisting of tung, oiticica, and dehydrated castor oil.

3. A magnetic ink comprising (a) a binder comprising at least one synthetic polymer; (b) a finely divided magnetic material; (c) a lecithin in amount sufficient to disperse the magnetic material; and (d) an amount of a drying oil containing two or more conjugated double bonds which is capable of reacting with the lecithin present to immobilize and prevent migration of the lecithin after the ink has been applied to a substrate.

4. The ink of claim 3, in which the drying oil is selected from the group consisting of tung, oiticica, and dehydrated castor oil.

5. The ink of claim 3, in which the magnetic material is iron oxide and the proportion of iron oxide to binder is about 40:50 parts by volume.

6. The ink of claim 3, in which the amount of lecithin ranges from about 2% to about 10% by volume of the total solids content of the ink.

7. The ink of claim 3, in which the proportion of drying oil to lecithin ranges from about 2:1 to about 1:2 parts by volume.

8. The ink of claim 3, in which the binder is a mixture of a butadiene-acrylonitrile copolymer and an acrylonitrile-styrene copolymer, ranging from about 40:60 to about 60:40 parts by weight, respectively.

9. A magnetic ink comprising (a) a binder comprising at least one synthetic polymer; (b) a finely divided magnetizable material in an amount by volume exceeding the amount of (a); (c) a lecithin in an amount sufficient to disperse (b); and (d) an amount of a drying oil containing two or more conjugated double bonds which is capable of reacting with the lecithin present to immobilize and prevent migration of the lecithin after the ink has been applied to a substrate.

References Cited

UNITED STATES PATENTS

| | | | |
|---|---|---|---|
| 3,082,171 | 3/1963 | Shoemaker et al. | 106—27 |
| 3,149,996 | 9/1964 | Wagner et al. | 252—62.54 |
| 3,247,117 | 4/1966 | Shoemaker et al. | 252—62.54 |

OTHER REFERENCES

1967 Merck Index, pp. 605–606.

DONALD E. CZAJA, Primary Examiner

DONALD J. BARRACK, Assistant Examiner

U.S. Cl. X.R.

117—138.8; 252—62.54; 260—23, 30.6